June 1, 1948.    A. J. CAMPBELL ET AL    2,442,585
POLARITY REVERSING SWITCH
Filed Aug. 25, 1945

INVENTORS.
AILEN J. CAMPBELL
JOHN P. BLOM
BY H.S. Grover
ATTORNEY

Patented June 1, 1948

2,442,585

UNITED STATES PATENT OFFICE 2,442,585

POLARITY REVERSING SWITCH

Allan John Campbell and John Peter Blom, Sydney, New South Wales, Australia, assignors to Amalgamated Wireless (Australasia) Limited, Sydney, New South Wales, Australia, a company of New South Wales Application August 25, 1945, Serial No. 612,683
In Australia November 18, 1944

2 Claims. (Cl. 175—363)

This invention relates to polarity reversing switch arrangements employing grid controlled rectifier valves.

The object of the invention is to provide, in an arrangement of the kind mentioned, means for obtaining an output potential, the polarity and magnitude of which may be selectively controlled.

A polarity reversing switch arrangement in accordance with this invention comprises a pair of grid-controlled rectifiers arranged for independent operation, means for applying alternating current operating potentials to the anodes and control electrodes of said rectifiers, a common output load resistance, and means for utilizing the phase relationship of said operating potentials for selectively operating said rectifiers to supply output potentials of opposite polarity across said common load resistance.

Figure 1:
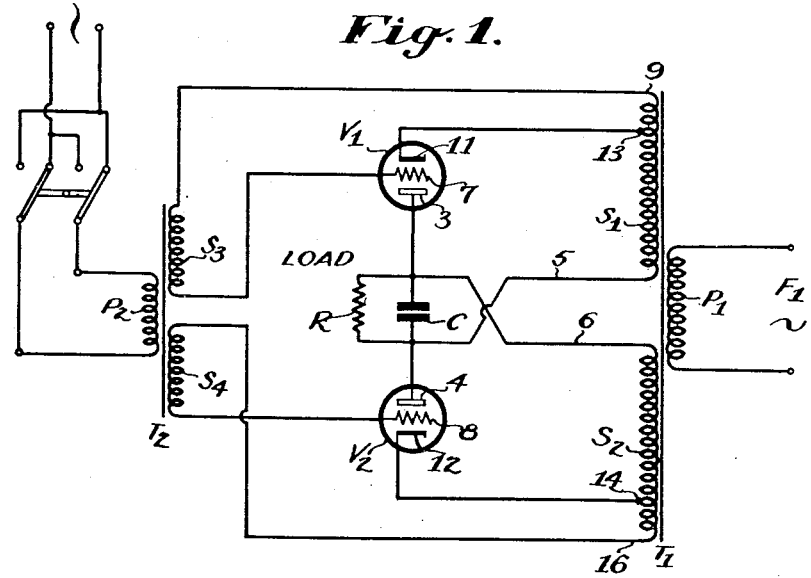
Figure 2:
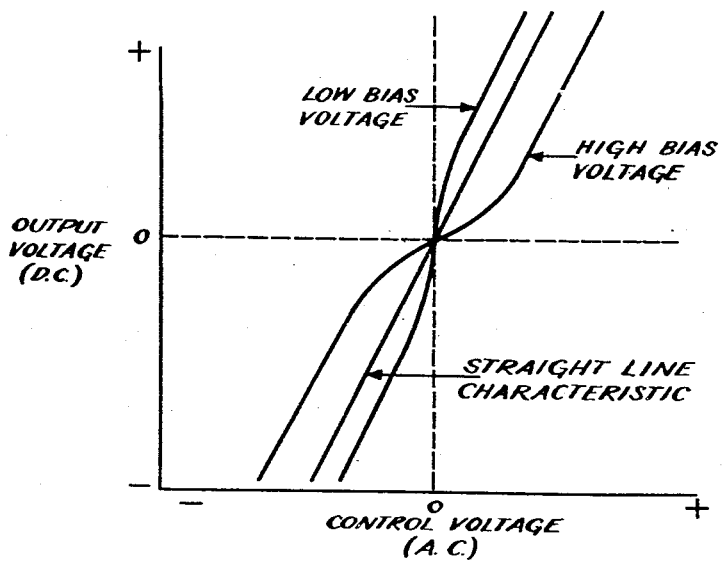

For a more complete understanding of the invention and the manner in which it is to be carried out, attention is now directed to the following description in connection with the accompanying drawings, in which Figure 1 illustrates the circuit arrangement of the apparatus employed in one practical embodiment for carrying out the subject invention, and Figure 2 is a graph showing the range of variation obtainable in the input voltage-output voltage characteristic of the rectifiers by control of the circuit constants.

Referring now to Figure 1, alternating current potentials from any convenient alternating current supply source (not shown) are fed to the primary winding P1 of a transformer T1. The transformer T1 is provided with two separate windings S1, S2 which supply alternating current operating potentials to the anodes 3, 4 of the valves V1, V2 respectively.

The secondary winding S1 supplies alternating current potentials to the anode 3 of the valve V1 through lead 5 and load resistance R while the secondary S2 supplies alternating current potentials of like amplitude but opposite phase to the anode 4 of the valve V2 through lead 6 and said load resistor R.

Control potentials are applied to the control grids 7, 8 of the valves V1, V2 through the transformer T2, which, in the present example, is provided with a primary winding P2 and two secondary windings S3, S4. The primary winding P2 is connected to the alternating current supply source which supplies the alternating current potentials to the transformer T1 or to any other convenient alternating current supply source of like frequency.

The secondary winding S3 has one end connected to the grid 7 of the valve V1 and the other end connected to the end 9 of the secondary S1 which supplies anode potentials to the same valve.

The secondary winding S4 has its ends connected in like manner to the grid 8 of the valve V2 and the end 16 of the secondary S2.

The cathodes 11, 12 of the valves V1, V2 are connected to suitable tapping points 13, 14 respectively, intermediate the ends of the associated secondary windings S1, S2.

From the foregoing it will be seen that the two valves V1, V2 which have been shown in the present example as triodes, are arranged to operate independently as half-wave rectifiers, each being supplied with alternating current anode potentials from an individual secondary winding of the transformer T1, said valves being connected so that their outputs appear in parallel, but with opposing polarity across the load resistor R and its associated filter condenser C.

With the grid and cathode of each valve connected to the associated secondary winding as shown in Figure 1, an alternating current biasing potential is applied to each valve.

As already pointed out, alternating current potentials are applied to the anodes of valves V1, V2 in like amplitude but in opposite phase. In order to carry out the requirements of the present invention, i. e., that the valves V1, V2 be selectively operated to supply output potentials of opposite polarity across the load resistor R, control potentials from the transformer T2 are applied to the grids of valves V1, V2 through the secondary windings S3, S4 in such a manner that only one valve conducts at a time when the control voltage is applied. This requirement is met if the control voltage applied to the grid of one valve is in phase with the control voltage applied to the control grid of the other valve and also in phase with the alternating current voltage applied to the anode of one of the valves.

More specifically, if the control voltage applied to the grids of V1 and V2 is in phase with the anode voltage applied to the valve V1, the valve V1 will conduct and cause current to flow through the load resistor R to develop a voltage of negative polarity on the anode-3 side of condenser C.

As the voltage applied to the anode 4 of V2 is in phase opposition to the voltage applied to the anode 3 of V1, it will also be in phase opposition to the control voltage and will remain non-conducting so long as the phase of the control voltage remains unchanged. So long as this condition of operation persists, an output potential having the polarity indicated will be developed across the load R.

If now the phase of the control voltage is changed through 180° to bring it in phase opposition to the anode voltage on V1, and in phase with the anode voltage of V2, the operating conditions will be reversed. The valve V2 will now conduct and the valve V1 will be rendered non-conducting. With the valve V2 conducting, current will flow through the common load resistor R in the opposite direction and develop a voltage of negative polarity on the anode-4 side of the condenser C.

From the above it will be seen that by simply reversing the phase of the control grid voltage, in any convenient manner the rectifiers V1, V2 may be selectively operated to provide output potentials of either polarity as desired. The phase of the control voltage applied to the primary winding P2 of the transformer T2 may be changed through 180 degrees by the use of a double pole double throw switch connected as shown in the attached drawing. The switch when operated to its alternative positions serves to change over the A. C. supply leads connected to the primary winding P2.

Variation of the amplitude of the voltage applied to the control grids of valves V1, V2 varies the angle of current flow in the conducting rectifier valve and so varies the amplitude of the output voltage. Thus by controlling the phase and amplitude of the control potentials, output potentials of any desired polarity or amplitude may be obtained as desired.

As already pointed out, fixed biasing potentials are applied to the grids of the valves V1, V2 by connecting their respective cathodes to a tapping point on the associated secondary winding of transformer T1.

The value of the biasing potentials applied to each valve may be varied within wide limits, for example, by varying the point of connection of the cathode to the associated secondary winding. By adjusting the fixed alternating current bias on the grids of the valves V1, V2, the input voltage-output voltage characteristics of the apparatus may be varied to suit particular requirements.

The input voltage-output voltage characteristic may be made a straight line over the whole of the range or varied as shown in Figure 2.

In certain applications in which the output voltage of reversible polarity is employed to control the direction of rotation of a reversible direct current motor, high accelerating or decelerating potentials may be required. In these circumstances the desired output characteristic may be obtained as indicated in Figure 2 by a reduction of the biasing potential. On the other hand, low accelerating or decelerating voltages may be obtained by increasing the biasing potentials above the normal value required to produce a linear characteristic.

Although triode valves have been employed in the present example, it will be appreciated that any other convenient type of valve capable of supplying the desired load requirements may be used. If, for example, a screen grid valve is employed, the operating potentials for the screen grid may be obtained by connecting said grid to the valve concerned to the associated secondary of transformer R1 at a tapping point located intermediate the cathode and anode connections on the same winding.

In the present example, the output resistor is shown in the anode legs of the rectifiers. In certain cases, where triodes are employed, the load resistor may be connected in the cathode legs without affecting the scope of the invention.

What is claimed is:

1. A polarity reversing switch arrangement comprising a pair of grid controlled half wave rectifiers arranged for independent operation, alternating current circuits wherein alternating current flows for applying alternating current potentials in phase opposition to the anodes of said rectifiers, said alternating current circuits having a portion which is common to the anode circuit of each rectifier, a load resistor in said common portion, circuits wherein alternating current flows for applying alternating current control potentials of like phase to the control grids of both of said rectifiers, said alternating current control potentials being in phase with the alternating current anode potentials supplied to one of said rectifiers, means for reversing the phase of said alternating current control potentials to cause said rectifiers to be selectively operated to provide output potentials of different polarity across said common load resistor and means for varying the amplitude of the alternating current potential applied to the control electrodes of said rectifiers to vary the magnitude of said output potentials.

2. A polarity reversing switch arrangement comprising a pair of rectifier tubes each having an anode, a cathode and a control grid, said rectifiers being of the grid control type, an alternating current circuit wherein alternating current flows connected between the anode and cathode of each tube for applying alternating potentials in phase opposition to the anodes of said rectifier tubes, said alternating current circuits having a common portion, a load impedance in said common portion of said two alternating current circuits, other alternating current circuits for applying alternating current control potentials of like phase to the control grids of both of said rectifiers, said last named alternating current potentials being in phase with the alternating current potentials supplied to the anode of one of said rectifiers and a switch for reversing the phase of said alternating current supplied to the control grids of said tubes to cause said rectifier tubes to be selectively operative to provide output potentials of different polarity across said common load resistor.

ALLAN JOHN CAMPBELL.
JOHN PETER BLOM.

REFERENCES CITED

The following references are of record in the file of this patent:

UNITED STATES PATENTS

| Number | Name | Date |
|---|---|---|
| 1,874,777 | Maser | Aug. 30, 1932 |
| 2,054,125 | Herold | Sept. 15, 1936 |
| 2,085,595 | Livingston | June 29, 1937 |
| 2,276,752 | Willis | Mar. 17, 1942 |